(12) United States Patent
Takahashi

(10) Patent No.: US 9,211,778 B2
(45) Date of Patent: Dec. 15, 2015

(54) VEHICLE AIR CONDITIONING DEVICE

(75) Inventor: Yasufumi Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 953 days.

(21) Appl. No.: 13/384,684

(22) PCT Filed: Apr. 21, 2011

(86) PCT No.: PCT/JP2011/002339
§ 371 (c)(1),
(2), (4) Date: Jan. 18, 2012

(87) PCT Pub. No.: WO2011/132429
PCT Pub. Date: Oct. 27, 2011

(65) Prior Publication Data
US 2012/0117993 A1    May 17, 2012

(30) Foreign Application Priority Data

Apr. 23, 2010  (JP) ................. 2010-099467
Sep. 2, 2010   (JP) ................. 2010-197070

(51) Int. Cl.
*B60H 1/22*   (2006.01)
*B60H 1/00*   (2006.01)
*B60H 1/32*   (2006.01)

(52) U.S. Cl.
CPC .......... *B60H 1/00907* (2013.01); *B60H 1/3213* (2013.01); *B60H 1/00899* (2013.01);
(Continued)

(58) Field of Classification Search
CPC ........... F25B 13/00; F25B 2313/02741; F25B 2600/11; F25B 2313/02341; F25B 2313/02344; F25B 2313/0231; F25B 5/04; F25B 2600/2513; F25B 41/062; F25B 2341/064; F25B 30/00; F25B 30/02; F25B 2313/0234; F25B 2313/02343; F24F 13/08; F25D 17/045; B60H 1/00035; B60H 1/00064; B60H 2001/00949

USPC ........... 62/160, 173, 186, 198, 222, 225, 244, 62/324.1
See application file for complete search history.

(56) References Cited

U.S. PATENT DOCUMENTS 5,526,650 A *  6/1996  Iritani ................ B60H 1/00907
                                                     62/205
5,598,887 A    2/1997  Ikeda et al.
(Continued)

FOREIGN PATENT DOCUMENTS

CN    1491820      4/2004
CN    101547803    9/2009
(Continued)

*Primary Examiner* — Jonathan Bradford
(74) *Attorney, Agent, or Firm* — Hamre, Schumann, Mueller & Larson, P.C.

(57) ABSTRACT

A vehicle air conditioner (1A) includes a heat pump circuit (2) including a compressor (11), an outdoor heat exchanger (13), an expansion mechanism (14), a first indoor heat exchanger (15), and a second indoor heat exchanger (16). The flow direction of a refrigerant in the heat pump circuit (2) is switched, by a switching member (12A), between a first direction in which the refrigerant discharged from the compressor (11) passes through the outdoor heat exchanger (13), the expansion mechanism (14), the first indoor heat exchanger (15), and the second indoor heat exchanger (16) in this order and returns to the compressor (11), and a second direction in which the refrigerant discharged from the compressor (11) passes through the first indoor heat exchanger (15), the expansion mechanism (14), the outdoor heat exchanger (13), and the second indoor heat exchanger (16) in this order and returns to the compressor (11). In the above-described configuration, the control of the expansion mechanism can be simplified during a heating operation and a cooling operation by handling a single expansion mechanism.

12 Claims, 12 Drawing Sheets

(52) U.S. Cl.
CPC . *B60H2001/00935* (2013.01); *B60H 2001/325* (2013.01); *B60H 2001/327* (2013.01); *B60H 2001/3255* (2013.01); *B60H 2001/3285* (2013.01); *F25B 2313/02343* (2013.01)

(56) References Cited

U.S. PATENT DOCUMENTS

| | | | |
|---|---|---|---|
| 5,669,231 A | | 9/1997 | Itoh et al. |
| 5,769,316 A | * | 6/1998 | Ikeda .................. B60H 1/00921 236/38 |
| 5,975,191 A | * | 11/1999 | Ohashi et al. ................... 165/43 |
| 5,996,360 A | * | 12/1999 | Tanaka ............... B60H 1/00907 62/159 |
| 6,237,357 B1 | | 5/2001 | Hirao et al. |
| 6,314,750 B1 | | 11/2001 | Ishikawa et al. |
| 2002/0112492 A1 | * | 8/2002 | Suitou et al. .................... 62/225 |
| 2003/0182961 A1 | * | 10/2003 | Nishida .............. B60H 1/00921 62/324.1 |
| 2010/0000713 A1 | | 1/2010 | Takahashi et al. |

FOREIGN PATENT DOCUMENTS

| | | | | |
|---|---|---|---|---|
| DE | 1262347 A2 | * | 12/2002 | ......... B60H 1/00885 |
| EP | 0913283 | | 5/1999 | |
| FR | 2769263 | | 4/1999 | |
| JP | 48-053340 | | 7/1973 | |
| JP | 5-338433 | | 12/1993 | |
| JP | 05338433 A | * | 12/1993 | ............... B60H 1/22 |
| JP | 7-232547 | | 9/1995 | |
| JP | 8-258544 | | 10/1996 | |
| JP | 9-066736 | | 3/1997 | |
| JP | 63-014047 | | 1/1998 | |
| JP | 2001-030743 | | 2/2001 | |
| JP | 2001030743 A | * | 2/2001 | ............... B60H 1/22 |
| JP | 2003-291625 | | 10/2003 | |
| WO | WO 2012/114767 | | 8/2012 | |

* cited by examiner

→ During cooling operation

----▶ During heating operation

VEHICLE AIR CONDITIONING DEVICE

TECHNICAL FIELD

The present invention relates to a vehicle air conditioner for cooling and heating a cabin.

BACKGROUND ART

Conventionally, for example, in a vehicle equipped with a gasoline engine, a heat pump is used for cooling, while the waste heat of the engine is used for heating. Typically, cooling is performed while circulating air inside the cabin, and heating is performed while introducing less humid outside air thereinto.

In recent years, hybrid vehicles using less waste heat of engines and electric vehicles unable to use waste heat of engines have become increasingly popular. To keep pace with this trend, vehicle air conditioners using heat pumps not only for cooling but also for heating have been developed.

When a heat pump is used for heating, it is preferable, from the viewpoint of reducing power consumption, to perform heating while circulating the air inside the cabin rather than introducing outside air. However, since the air inside the cabin contains moisture derived from the occupants, if the air inside the cabin is circulated during heating, the moisture may cause fogging of the windows. In view of this, a vehicle air conditioner is required to have a function of dehumidifying the air inside the cabin also during heating.

For example, Patent Literature 1 discloses an air conditioner for an electric vehicle as shown in FIG. 13. This air conditioner includes a compressor 101 driven by an electric motor, an outside heat exchanger 102, an expansion valve 103, a heat absorbing indoor heat exchanger 104, and a four-way valve 105 for forming a loop connecting these components 101 to 104 in this order during a cooling operation. A heat releasing indoor heat exchanger 106 and an expansion valve 107 are connected to the other two ports of the four-way valve 105 so as to form another loop. Air inside the cabin is supplied to the heat absorbing indoor heat exchanger 104 by a fan 110. A high temperature and high pressure gas refrigerant compressed in the compressor 101 is introduced to the heat releasing indoor heat exchanger 106 during a heating operation, and this heat releasing indoor heat exchanger 106 is placed downstream of the heat absorbing indoor heat exchanger 104 in the direction of the air flow formed by the fan 110.

In the above-described air conditioner, during the cooling operation, the gas refrigerant compressed in the compressor 101 flows through the four-way valve 105 in a direction of a solid line arrow, changes to a liquid refrigerant through heat exchange with outside air in the outdoor heat exchanger 102, and then is throttled through the expansion valve 103 and adiabatically expanded. The adiabatically expanded liquid refrigerant changes to a gas refrigerant through heat exchange with cabin circulating air supplied by the fan 110 in the heat absorbing indoor heat exchanger 104, and returns to the compressor 101.

On the other hand, during the heating operation, the gas refrigerant compressed in the compressor 101 flows through the four-way valve 105 in a direction of a dotted line arrow, changes to a liquid refrigerant through heat exchange with cabin circulating air supplied by the fan 110 in the heat releasing indoor heat exchanger 106, while heating the circulating air. The liquid refrigerant leaving the heat releasing indoor heat exchanger 106 passes through the expansion valve 107, the four-way valve 105, the outdoor heat exchanger 102, the expansion valve 103, and the heat absorbing indoor heat exchanger 104 in this order and returns to the compressor 101. The liquid refrigerant is throttled through the expansion valve 107 and adiabatically expanded, and then changes to a gas refrigerant through heat absorption in the outdoor heat exchanger 102 and in the heat absorbing indoor heat exchanger 104, while cooling the circulating air in the outdoor heat exchanger 102. As a result, condensation water is generated on the surface of the heat absorbing indoor heat exchanger 104. The condensation water drops into a drain pan 108 and is exhausted through a drain pipe 109 to the outside of the cabin.

In this way, the air inside the cabin circulated by the fan 110 is cooled and dehumidified in the heat absorbing indoor heat exchanger 104, but it is heated in the heat releasing indoor heat exchanger 106. This makes it possible to perform heating while dehumidifying the air inside the cabin.

CITATION LIST

Patent Literature

Patent Literature 1 JP 2001-30743 A

SUMMARY OF INVENTION

Technical Problem

However, in the air conditioner for an electric vehicle disclosed in Patent Literature 1, only the opening of one expansion valve 103 needs to be controlled during the cooling operation, but the opening of the expansion valve 107 also needs to be controlled during the heating operation. This means that two expansion valves must be controlled for cooling and heating, which requires complicated control, resulting in problems of deterioration in the size, reliability and cost of the air conditioner including the piping system and the expansion valves.

The present invention has been made to solve the above conventional problems, and it is an object of the present invention to provide a vehicle air conditioner intended to simplify the control during a heating operation and a cooling operation.

Solution to Problem

In order to solve the above problems, the present invention provides a vehicle air conditioner for cooling and heating a cabin. This vehicle air conditioner includes: a heat pump circuit including: a compressor for compressing a refrigerant; an outdoor heat exchanger for performing heat exchange between the refrigerant and air outside the cabin; an expansion mechanism for expanding the refrigerant; and a first indoor heat exchanger and a second indoor heat exchanger each for performing heat exchange between the refrigerant and air blown into the cabin by a fan; and a switching member, provided in the heat pump circuit, for switching a flow direction of the refrigerant in the heat pump circuit between a first direction and a second direction. The first direction is a direction in which the refrigerant discharged from the compressor passes through the outdoor heat exchanger, the expansion mechanism, the first indoor heat exchanger, and the second indoor heat exchanger in this order and returns to the compressor, and the second direction is a direction in which the refrigerant discharged from the compressor passes through the first indoor heat exchanger, the expansion mechanism, the outdoor heat exchanger, and the second indoor heat exchanger in this order and returns to the compressor.

Advantageous Effects of Invention

According to the present invention, both of a cooling operation (in the first direction) and a heating operation (in the second direction) can be performed with a simple configuration to control a single expansion valve.

DESCRIPTION OF EMBODIMENTS

Hereinafter, the embodiments of the present invention will be described with reference to the drawings.

(First Embodiment)

Figure 1:
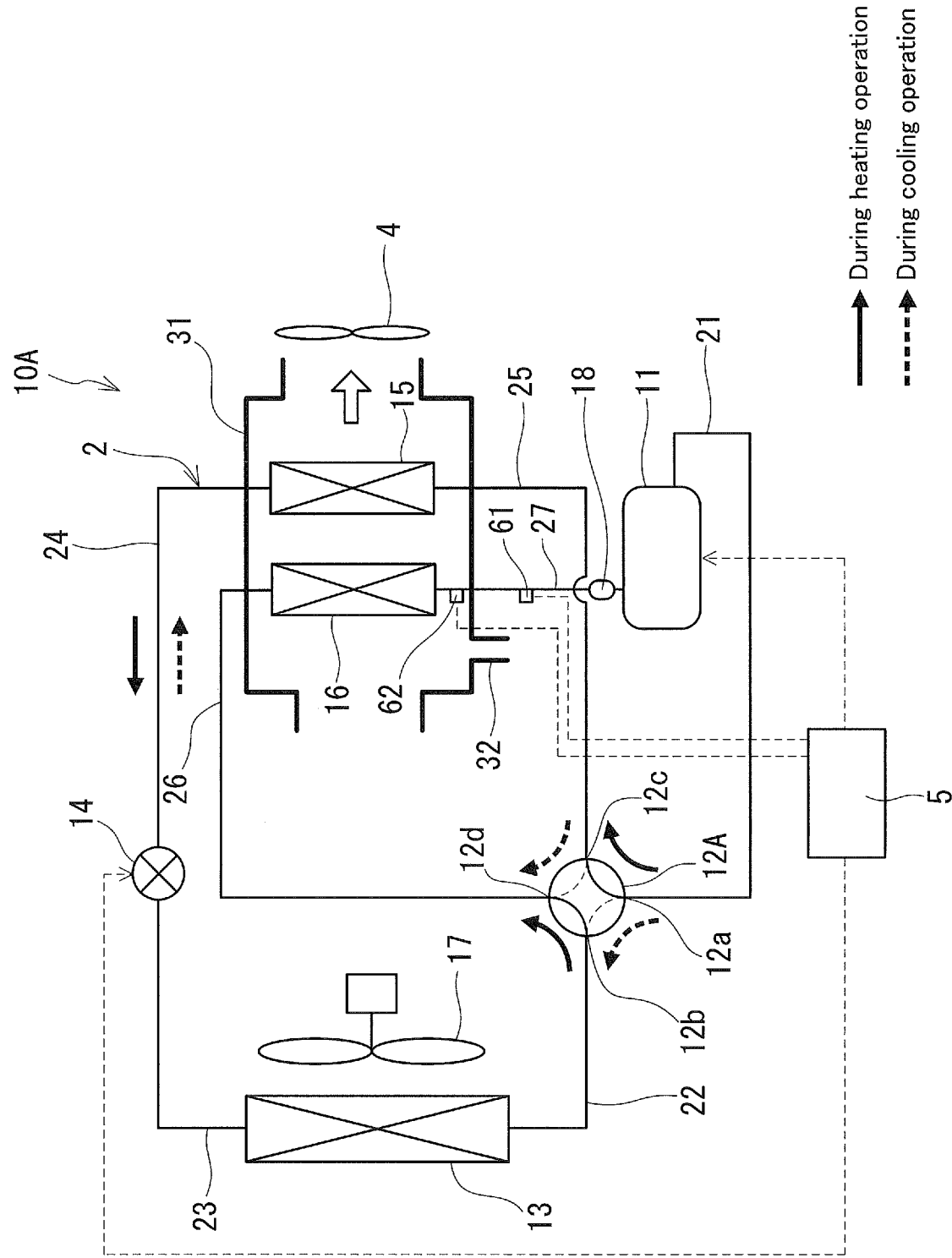
FIG. 1 is a diagram showing a configuration of a vehicle air conditioner according to a first embodiment of the present invention.

FIG. 1 is a diagram showing the configuration of a vehicle air conditioner 10A according to the first embodiment of the present invention. This vehicle air conditioner 10A is designed to cool and heat a cabin (not shown), and includes a heat pump circuit 2 for circulating a refrigerant and a controller 5. As the refrigerant, R143a, R410A, HFO-1234yf, $CO_2$, or the like can be used.

The heat pump circuit 2 includes a compressor 11, an outdoor heat exchanger 13, an expansion valve 14, a first indoor heat exchanger 15, and a second indoor heat exchanger 16. The heat pump circuit 2 is further provided with a four-way valve 12A, as a switching member. The valve 12A switches the flow direction of the refrigerant in the heat pump circuit 2 between the first direction indicated by dotted line arrows and a second direction indicated by solid line arrows. The first direction is a direction in which the refrigerant discharged from the compressor 11 passes through the outdoor heat exchanger 13, the expansion valve 14, the first indoor heat exchanger 15, and the second indoor heat exchanger 16 in this order and returns to the compressor 11. The second direction is a direction in which the refrigerant discharged from the compressor 11 passes through the first indoor heat exchanger 15, the expansion valve 14, the outdoor heat exchanger 13, and the second indoor heat exchanger 16 in this order and returns to the compressor 11. That is, both of the cooling operation (in the first direction) and the heating operation (in the second direction) can be performed with a simple configuration to control a single expansion valve 14.

The four-way valve 12A is configured to be shifted between a first position in which a first port 12a is in communication with a second port 12b and a third port 12c is in communication with a fourth port 12d and a second position in which the first port 12a is in communication with the third port 12c and the second port 12b is in communication with the fourth port 12d. The four-way valve 12A is shifted to the first position during the cooling operation and to the second position during the heating operation by the controller 5.

The compressor 11 is designed to be driven by an electric motor (not shown), and compresses a refrigerant drawn through an inlet and discharges the compressed refrigerant through an outlet. The outlet of the compressor 11 is connected to the first port 12a of the four-way valve 12A by a first pipe 21.

The outdoor heat exchanger 13 is placed, for example, in the front of an automobile, and exchanges heat between the refrigerant and outside air (air outside the cabin) supplied by the movement of the vehicle and by the outdoor fan 17. The outdoor heat exchanger 13 is connected to the second port 12b of the four-way valve 12A by a second pipe 22.

The expansion valve 14 is designed to expand the refrigerant, and is one example of the expansion mechanism of the present invention. As the expansion mechanism of the present invention, a positive displacement expander for recovering power from an expanding refrigerant, or the like, may be used. The expansion valve 14 is connected to the outdoor heat exchanger 13 by a third pipe 23.

The first indoor heat exchanger 15 and the second indoor heat exchanger 16 each exchange heat between the refrigerant and air blown into the cabin by the indoor fan 4. The first indoor heat exchanger 15 is connected to the expansion valve 14 by a fourth pipe 24 and to the third port 12c of the four-way valve 12A by a fifth pipe 25. The second indoor heat exchanger 16 is connected to the fourth port 12d of the four-way valve 12A by a sixth pipe 26 and to the inlet of the compressor 11 by a seventh pipe 27. The seventh pipe 27 is provided with an accumulator 18.

In the present embodiment, the first indoor heat exchanger 15 and the second indoor heat exchanger 16 are disposed in a duct 31 through which air inside the cabin is allowed to flow by the indoor fan 4. That is, the air inside the cabin is circulated through the duct 31. The duct 31 is provided with a drain pipe 32 for exhausting water that has been separated from the cabin circulating air in the duct 31 to the outside of the cabin.

All of the air that is allowed to flow through the duct 31 by the indoor fan 4 need not be the air inside the cabin. A part or all of the air may be outside air used to ventilate the cabin. The following description is given by taking, as an example, the case where all of the air taken into the duct 31 by the indoor fan 4 and supplied to the first indoor heat exchanger 15 and the second indoor heat exchanger 16 is the air inside the cabin.

Furthermore, in the present embodiment, the first indoor heat exchanger 15 and the second indoor heat exchanger 16 are arranged in the flow direction of the air in the duct 31, and the second indoor heat exchanger 16 is located upstream of the first indoor heat exchanger 15. Both of the second indoor heat exchanger 16 and the first indoor heat exchanger 15 have a size large enough to fill the space inside the duct 31. Therefore, when the air inside the cabin is taken into the duct 31 by the indoor fan 4, the air comes in contact with the second indoor heat exchanger 16 and then with the first indoor heat exchanger 15.

Figure 3:
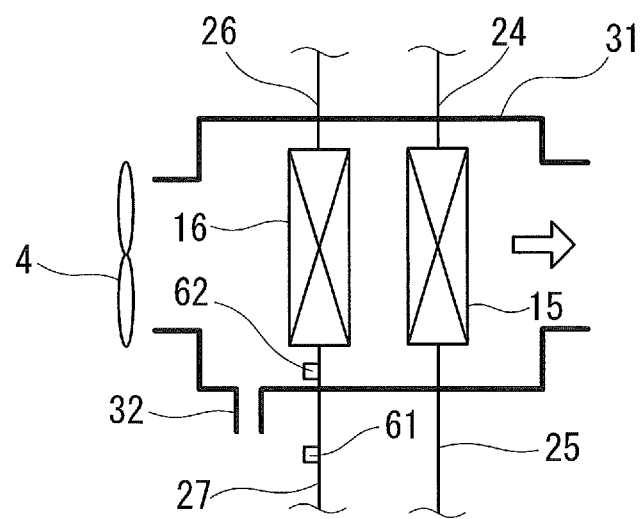
FIG. 3 is a diagram showing another arrangement of an indoor fan.

The indoor fan 4 may be disposed at the outlet of the duct 31 as shown in FIG. 1, or may be disposed at the inlet of the duct 31 as shown in FIG. 3. A blower may be used as the indoor fan 4.

The above-mentioned seventh pipe 27 connecting the second indoor heat exchanger 16 and the inlet of the compressor 11 is provided with a superheat sensor 62 (corresponding to a refrigerant temperature sensor of the present invention) for detecting the temperature of the refrigerant leaving the second indoor heat exchanger 16, and further with a pressure sensor 61 for detecting the pressure of the refrigerant drawn into the compressor 11. In the illustrated example, the superheat sensor 62 is placed inside the duct 31, but it may be placed outside the duct 31. The pressure sensor 61 may be provided in the sixth pipe 26.

The controller 5 is connected to an operation panel (not shown) disposed in the cabin and to the superheat sensor 62 and the pressure sensor 61. The controller 5 controls the driving of the outdoor fan 17 and the indoor fan 4, the rotational speed of the compressor 11, and the opening of the expansion valve 14, and shifts the four-way valve 12A.

Next, the action of the vehicle air conditioner 10A during the heating operation and that during the cooling operation are described.

During the heating operation, the four-way valve 12A is shifted to the second position by the controller 5, and a high temperature and high pressure gas refrigerant compressed in the compressor 11 flows through the four-way valve 12A in the direction of a solid line arrow. The gas refrigerant releases heat to the cabin circulating air supplied by the indoor fan 4 and condenses in the first indoor heat exchanger 15, while heating the cabin circulating air. After that, the resulting liquid refrigerant is throttled through the expansion valve 14 and adiabatically expanded into a low temperature and low pressure state. Then, the refrigerant absorbs heat from the outside air and a part thereof evaporates in the outdoor heat exchanger 13. The refrigerant leaving the outdoor heat exchanger 13 again passes through the four-way valve 12A and enters the second indoor heat exchanger 16. In the second indoor heat exchanger 16, the refrigerant absorbs heat from the cabin circulating air supplied by the indoor fan 4 and the remaining part of the liquid refrigerant evaporates, while cooling the cabin circulating air. As a result, condensation water is generated on the surface of the second indoor heat exchanger 16, and the cabin circulating air is dehumidified. The condensation water drops into a drain pan (not shown) disposed in the duct 31 and is exhausted through a drain pipe 32 to the outside of the cabin. The gas refrigerant leaving the second indoor heat exchanger 16 is again drawn into the compressor 11.

In this way, the cabin circulating air, which is taken into the duct 31 by the indoor fan 4, is dehumidified while passing through the second indoor heat exchanger 16, and then heated while passing through the first indoor heat exchanger 15. This makes it possible to perform heating while dehumidifying the cabin circulating air.

Figure 2:
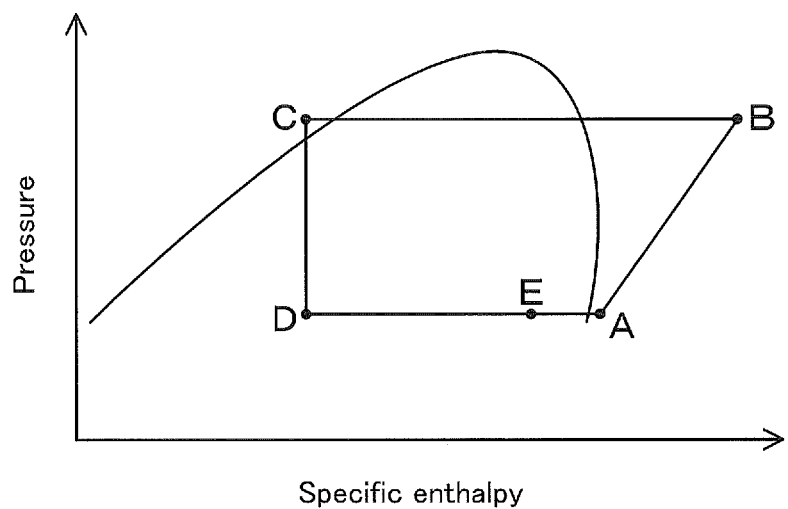
FIG. 2 is a Mollier diagram of the vehicle air conditioner shown in FIG. 1 (during a heating operation).

FIG. 2 shows a Mollier diagram of the vehicle air conditioner 10A of the present embodiment during the heating operation. Each process of the cycle of FIG. 2 is described below.

A refrigerant in a low temperature and low pressure state (state A) is compressed in the compressor 11 to a high temperature and high pressure state (state B). While releasing heat in the first indoor heat exchanger 15, the high temperature and high pressure refrigerant changes to a medium temperature and high pressure state (state C). While passing through the expansion valve 14, the medium temperature and high pressure refrigerant changes to a low temperature and low pressure gas-liquid two phase refrigerant (state D). While passing through the outdoor heat exchanger 13, the gas-liquid two phase refrigerant absorbs heat and evaporates (state E).

When the air inside the cabin supplied by the indoor fan 4 is dehumidified in the second indoor heat exchanger 16, the refrigerant that has passed through the outdoor heat exchanger 13 takes a quantity of heat corresponding to the latent heat from the air inside the cabin and changes to the state A. That is, the quantity of heat released in the first indoor heat exchanger 15 (i.e., a change from the state B to the state C) can be increased by the quantity of heat corresponding to the latent heat (i.e., a change from the state E to the state A). Therefore, the latent heat of the moisture in the air recovered in the second indoor heat exchanger 16 can be used for heating.

During the cooling operation, the four-way valve 12A is shifted to the first position by the controller 5, and a high temperature and high pressure gas refrigerant compressed in the compressor 11 flows through the four-way valve 12A in the direction of a dotted line arrow. The gas refrigerant releases heat to the outside air and condenses in the outdoor heat exchanger 13. After that, the resulting liquid refrigerant is throttled through the expansion valve 14 and adiabatically expanded into a low temperature and low pressure state. Then, the refrigerant absorbs heat from the cabin circulating air supplied by the indoor fan 4 and a part thereof evaporates in the first indoor heat exchanger 15, while cooling the cabin circulating air. The refrigerant leaving the first indoor heat exchanger 15 again passes through the four-way valve 12A and enters the second indoor heat exchanger 16. In the second indoor heat exchanger 16, the refrigerant absorbs heat from the cabin circulating air supplied by the indoor fan 4 and the remaining part of the liquid refrigerant evaporates, while cooling the cabin circulating air. When the refrigerant passes through the first indoor heat exchanger 15, its pressure is reduced by an amount corresponding to the pressure loss therein, and thus the evaporation temperature in the second indoor heat exchanger 16 becomes lower than that in the first indoor heat exchanger 15. Therefore, the cabin circulating air is dehumidified mainly in the second indoor heat exchanger 16. The gas refrigerant leaving the second indoor heat exchanger 16 is again drawn into the compressor 11.

In this way, the cabin circulating air, which is taken into the duct 31 by the indoor fan 4, is cooled while passing through the second indoor heat exchanger 16 and the first indoor heat exchanger 15. With the use of two heat exchangers, i.e., the second indoor heat exchanger 16 and the first indoor heat exchanger 15, to cool the cabin circulating air, the cooling capacity and the efficiency of the refrigeration cycle can be improved.

Next, the control performed by the controller 5 is described specifically. It is conceivable that the dryness of the refrigerant leaving the second indoor heat exchanger 16 varies with a change in the running speed of the vehicle or a change in the temperature set for the cabin by a user. For example, when the degree of superheat, which is the temperature difference between the temperature of the refrigerant leaving the second indoor heat exchanger 16 and the saturation temperature of the refrigerant at a pressure at which it is drawn into the compressor 11, is lower than a predetermined value (for example, 3° C. to 5° C.), liquid compression may occur in the compressor 11, resulting in a decrease in the reliability of the compressor 11. When the degree of superheat is greater than a predetermined value (for example, 5° C. to 7° C.), the COP (Coefficient of Performance) of the heat pump decreases. Furthermore, in this case, since the discharge temperature increases with an increase in the suction temperature, the rotational speed of the compressor 11 must be reduced and thus the required refrigerant circulation amount cannot be secured.

Generally, the refrigerant circulation amount is the key to the control of the capacity of a heat pump. The refrigerant circulation amount depends on the rotational speed of the compressor 11. If the rotational speed of the compressor 11 is excessively high, there is an increased risk that the discharge pressure and the discharge temperature increase beyond the pressure and the temperature low enough to ensure the reliability. That is, if the pressure of the refrigerant discharged from the compressor 11 rises too high, the closed casing and the mechanism constituting the compressor 11 are subjected to load, which may cause damage to these devices. Furthermore, if the temperature of the refrigerant discharged from the compressor 11 rises too high, that temperature may exceed the highest temperature that the insulating coating of the winding of the driving motor of the compressor 11 can withstand.

Hence, in the present embodiment, the controller 5 controls the rotational speed of the compressor 11 and the opening of the expansion valve 14 in accordance with the degree of superheat and the required capacity depending on the inputs into the operation panel, to maintain the optimum cycle conditions for the heat pump.

The controller 5 controls, in accordance with the required capacity, the rotational speed of the compressor 11 to such an extent that the discharge temperature from the compressor 11 does not exceed a predetermined temperature (for example, 100° C.). In order to achieve this, the upper limit of the rotational speed of the compressor 11 may be predetermined, or a discharge temperature sensor may be provided in the first pipe 21 to monitor the temperature of the refrigerant discharged from the compressor 11.

The controller 5 has a memory (not shown), and the saturation temperatures corresponding to the pressures of the refrigerant are stored in this memory. The controller 5 reads out from the memory a saturation temperature at a pressure detected by the pressure sensor 61, as appropriate, compares the read-out saturation temperature with the refrigerant temperature detected by the superheat sensor 62, and controls the opening of the expansion valve 14 so that the temperature difference between these temperatures coincides with a predetermined degree of superheat.

In the vehicle air conditioner 10A of the present embodiment, the controller 5 allows the temperature of the discharged refrigerant to be maintained at a temperature equal to or lower than a predetermined temperature based on the proper rotational speed of the compressor 11, while maintaining the degree of superheat of the refrigerant drawn into the compressor 11 constant based on the proper opening of the expansion valve 14. As a result, the optimum cycle conditions for the heat pump can be maintained.

The opening of the expansion valve 14 can be arbitrarily determined from the fully closed position to the fully open position, with the movement of the valve in accordance with the rotation of a stepping motor. If 480 steps are required to change the opening of the expansion valve 14 from the fully closed position to the fully open position, 0 to 480 pulse signals are input to the stepping motor.

At the start of the cooling operation or the heating operation, the expansion valve 14 is opened at an initial opening PLS0, which is set in accordance with the required capacity. For example, if the required capacity has three levels, the initial opening PLS0 is set to, for example, 16.7% (80 steps), 20.8% (100 steps), and 25% (120 steps), in accordance with these levels of the required capacity. For five minutes after the start of the operation, the initial opening is maintained, and then the opening is changed by the degree corresponding to the microsteps ΔPLS to be moved every 30 seconds, for example.

When Tsat is the saturation temperature of the refrigerant at a pressure at which it is drawn into the compressor 11 and Ts is the suction temperature of the compressor 11 (i.e., the temperature of the refrigerant detected by the superheat sensor 62), the microsteps ΔPLS can be determined using the following equation so as to obtain the temperature difference of 5° C. between Tsat and Ts:

$$\Delta PLS = (T\text{sat}) - (Ts) + 5 \quad \text{(Equation 1)}$$

As described above, in the vehicle air conditioner 10A of the present embodiment, the cooling operation and the heating operation can be switched instantaneously only by shifting the four-way valve 12A. The cabin circulating air is dehumidified in the second indoor heat exchanger 16 during the heating operation. Also during the cooling operation, it is dehumidified mainly in the second indoor heat exchanger 16 because the evaporation temperature in the second indoor heat exchanger 16 is lower than that in the first indoor heat exchanger 15, as described above. Thus, the second indoor heat exchanger 16 always contributes to the dehumidification. Therefore, it is possible to prevent condensation water on the surface of the second indoor heat exchanger 16 from evaporating and thus causing degradation of the in-vehicle environment or fogging of the windshield even when the cooling operation is switched to the heating operation.

Figure 13:
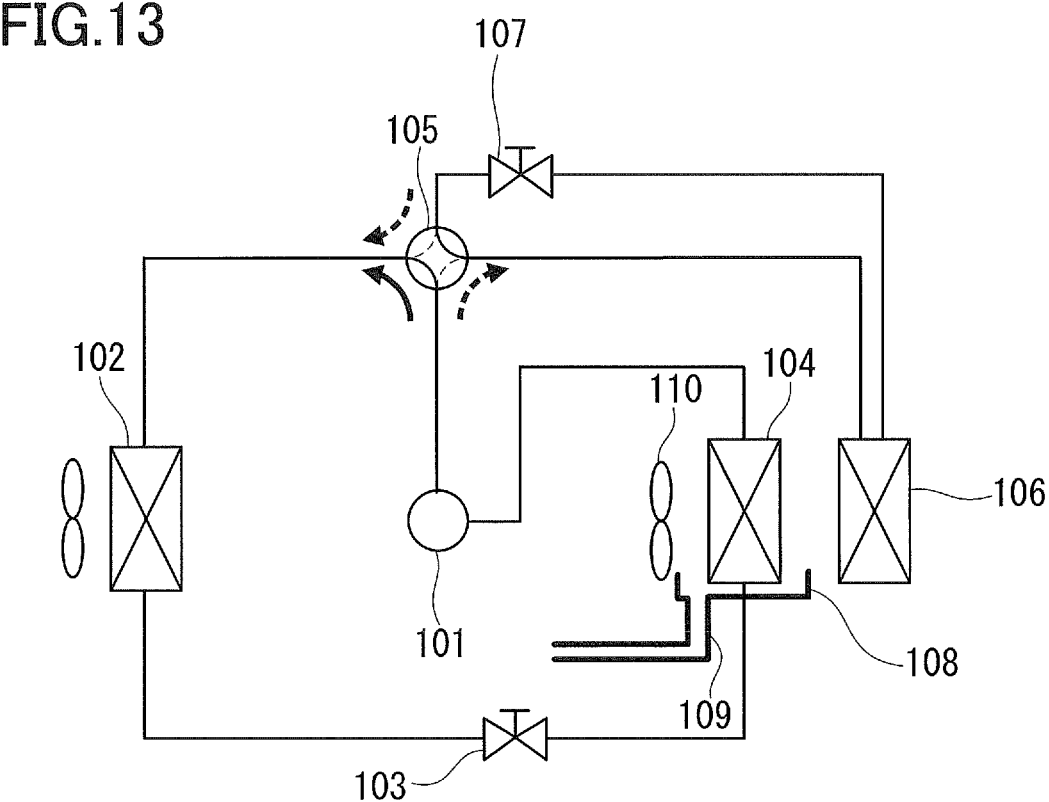
FIG. 13 is a diagram showing a configuration of a conventional air conditioner for an electric vehicle.

In the conventional air conditioner for an electric vehicle shown in FIG. 13, the refrigerant is confined in a flow path including the indoor heat exchanger 106, as a closed space, during the cooling operation. The refrigerating machine oil also is trapped therein and the amount of oil required for the compressor cannot be secured, which adversely affects the operation. Therefore, when the outside air temperature rises, the pressure of the confined refrigerant in the flow path increases, which may cause damage to the devices constituting the flow path. In contrast, in the present embodiment, even if the cooling operation and the heating operation are switched, no such flow path is formed to confine the refrigerant. Therefore, it is possible to prevent the adverse effects of the pressure increase of the refrigerant with an increase in outside air temperature.

Furthermore, in the conventional air conditioner for an electric vehicle shown in FIG. 13, the opening of the two expansion valves 103, 107 must be controlled in addition to the control of the four-way valve 105 to switch the heating operation and the cooling operation. Therefore, complicated control is required, resulting in deterioration in the size, reliability and cost of the air conditioner including the piping system and the expansion valves.

In contrast, in the vehicle air conditioner 10A of the present embodiment, the cooling operation and the heating operation can be performed with a simple configuration to control a four-way valve and a single expansion mechanism.

<Modification>

In the embodiment described above, the saturation temperatures corresponding to the pressures of the refrigerant are stored in the memory of the controller 5, and the controller 5 reads out from the memory a saturation temperature at a pressure detected by the pressure sensor 61, but the present invention is not limited to this. For example, the fact that the refrigerant is in the gas-liquid two phase state between the expansion valve 14 and the evaporator (i.e., the outdoor heat exchanger 13 during the heating operation, and the first indoor heat exchanger 15 during the cooling operation) may be used to obtain a saturation temperature.

Figure 4:
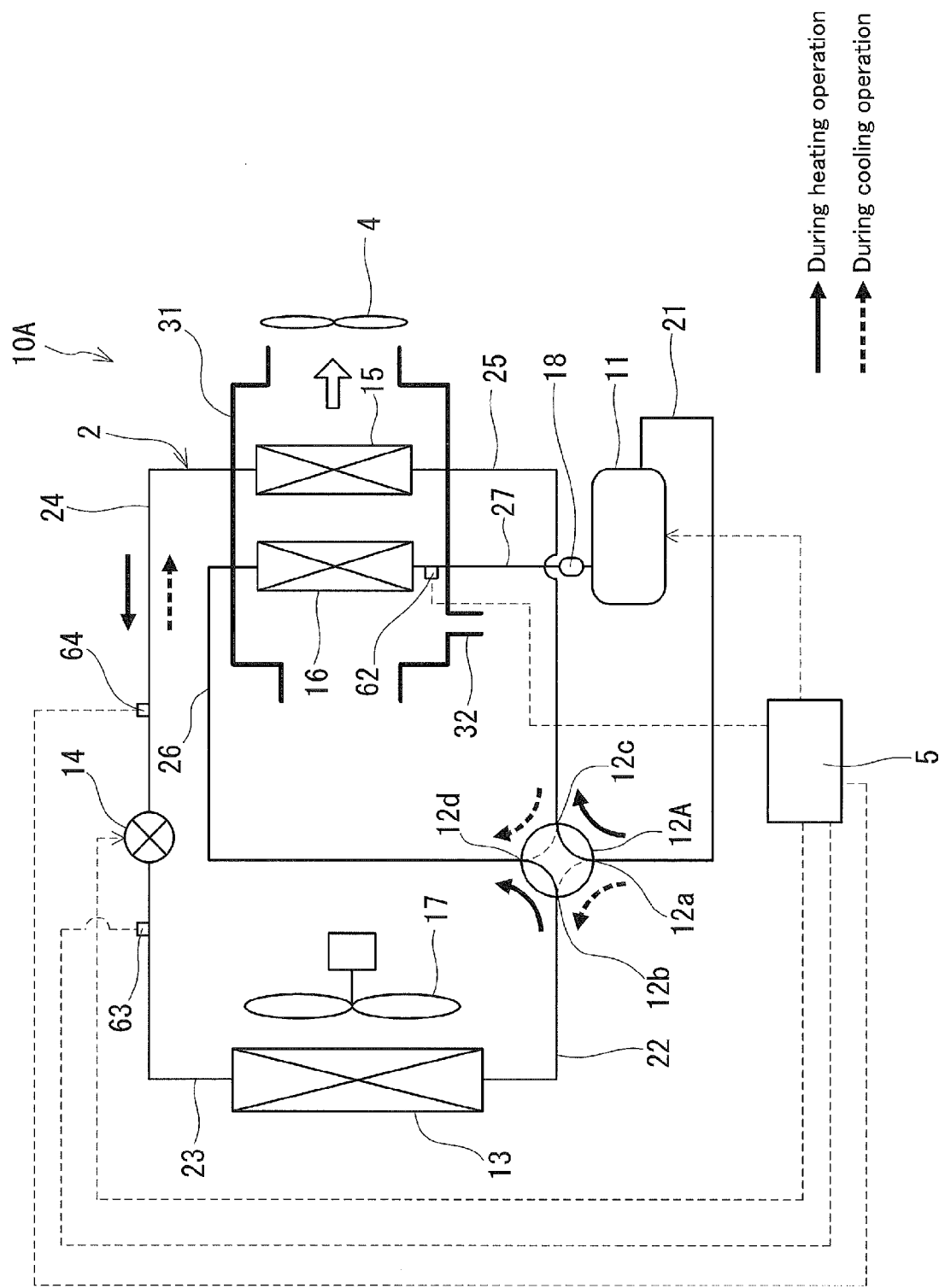
FIG. 4 is a diagram showing a configuration of a vehicle air conditioner according to a modification of the first embodiment.

Specifically, as shown in FIG. 4, a first gas-liquid refrigerant temperature sensor 63 is provided in the third pipe 23 connecting the expansion valve 14 and the outdoor heat exchanger 13, and a second gas-liquid refrigerant temperature sensor 64 is provided in the fourth pipe 24 connecting the expansion valve 14 and the first indoor heat exchanger 15. The controller 5 can use, as a saturation temperature, a value detected by the first gas-liquid refrigerant temperature sensor 63 during the heating operation, and a value detected by the second gas-liquid refrigerant temperature sensor 64 during the cooling operation.

Figure 5:
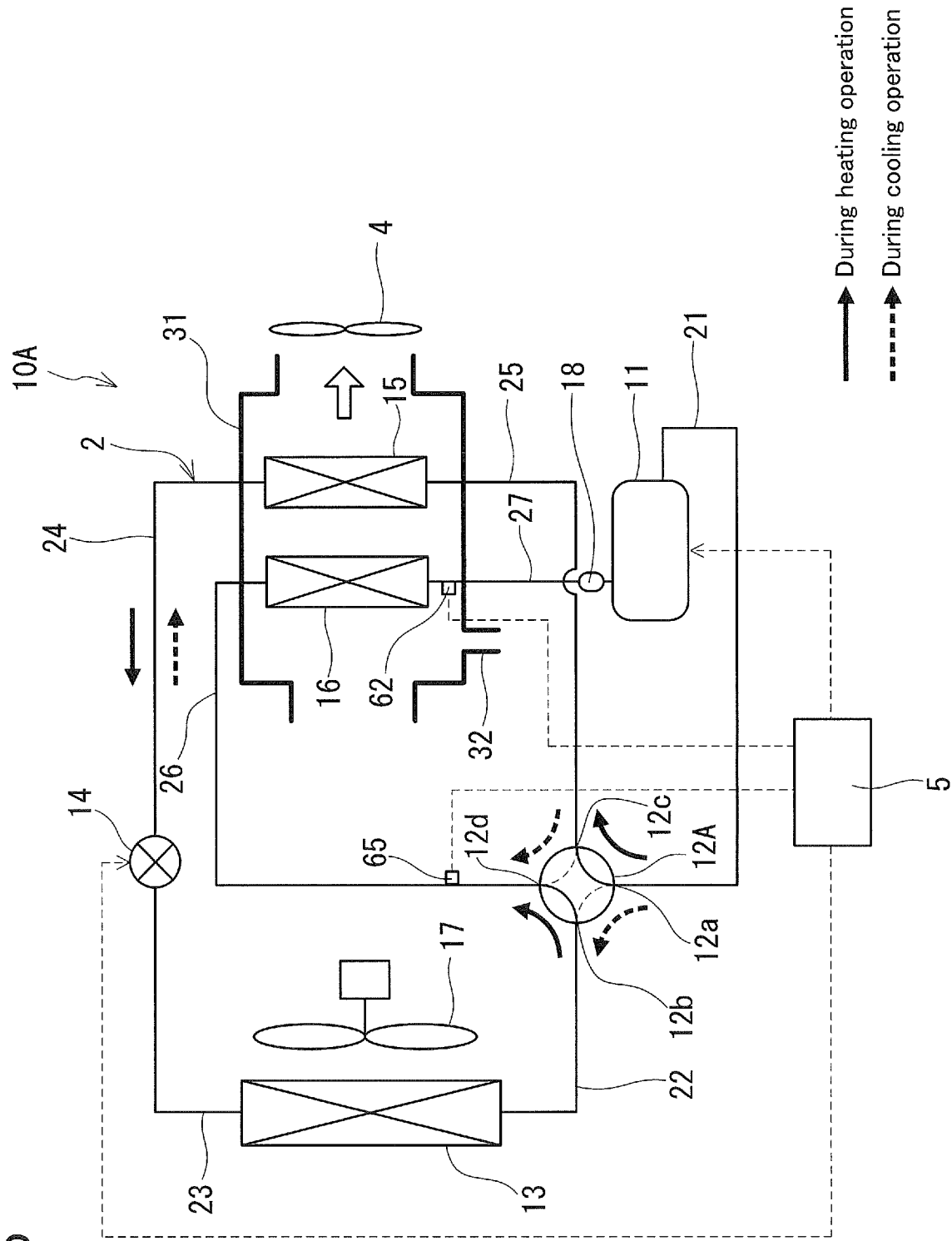
FIG. 5 is a diagram showing a configuration of a vehicle air conditioner according to another modification of the first embodiment.

Alternatively, as shown in FIG. 5, a saturation temperature sensor 65 for detecting the temperature of the refrigerant entering the second indoor heat exchanger 16 may be provided in the sixth pipe 26 to use a value detected by the saturation temperature sensor 65 as a saturation temperature.

Furthermore, since the temperature of the evaporator (i.e., the outdoor heat exchanger 13 during the heating operation, and the first indoor heat exchanger 15 during the cooling operation) is constant in a zone in which the refrigerant is changing from a liquid to a gas in the evaporator, the temperature of the evaporator also can be used instead of the saturation temperature.

Figure 6:
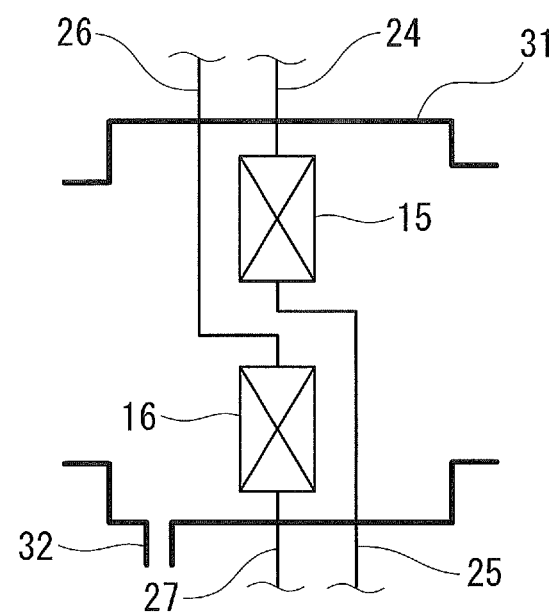
FIG. 6 is a diagram showing another arrangement of a first indoor heat exchanger and a second indoor heat exchanger in a duct.

The first indoor heat exchanger 15 and the second indoor heat exchanger 16 need not necessarily be arranged in the air flow direction in the duct 31. For example, as shown in FIG. 6, they may be arranged in the direction perpendicular to the air flow direction in the duct 31.

Figure 7:
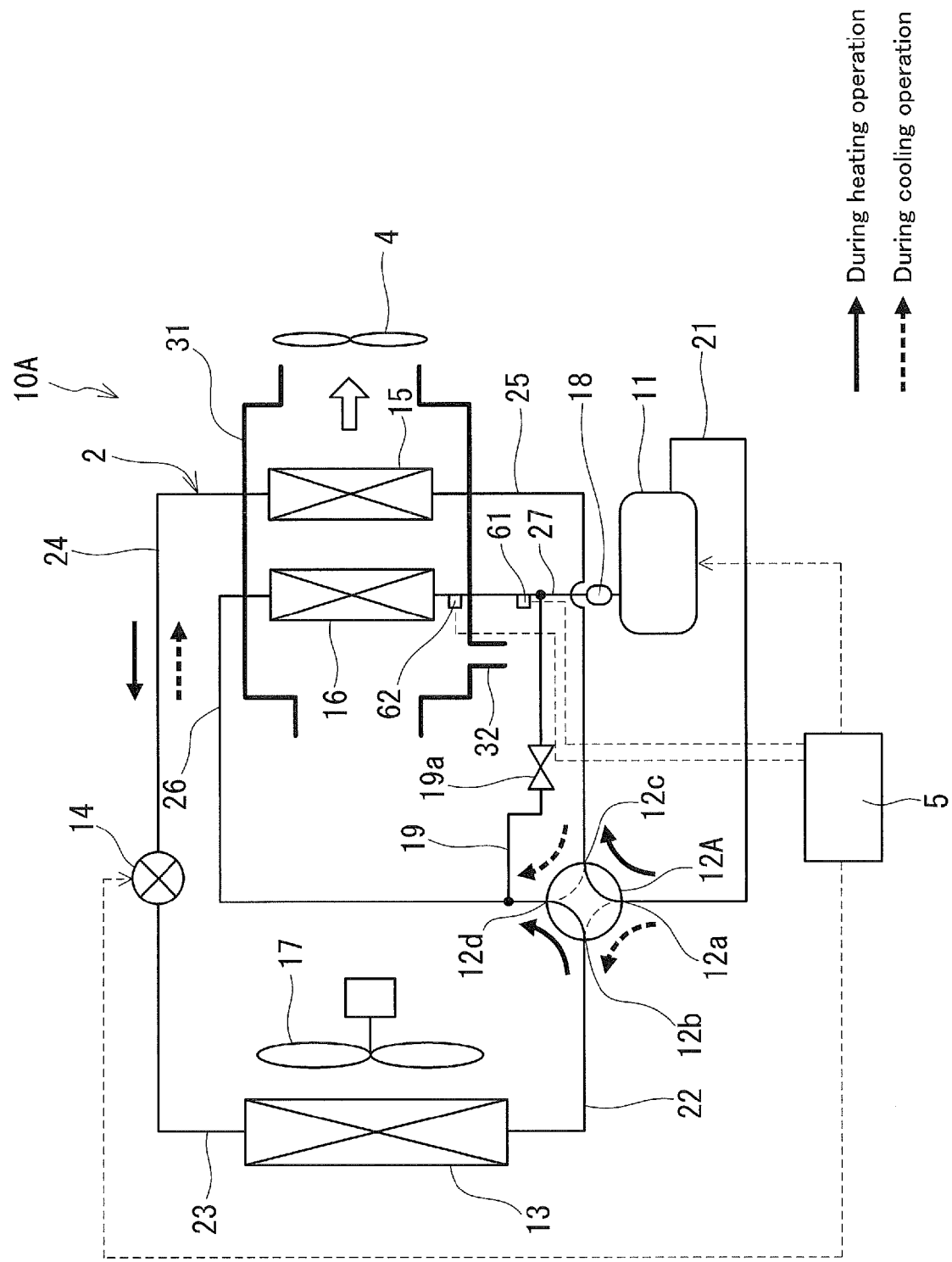
FIG. 7 is a diagram showing a configuration of a vehicle air conditioner according to still another modification of the first embodiment.

Furthermore, as shown in FIG. 7, the sixth pipe 26 and the seventh pipe 27 may be connected by a bypass passage 19 provided with an on-off valve 19a to bypass the second indoor heat exchanger 16 so that the on-off valve 19a is opened when no dehumidification is necessary during the heating operation. This not only prevents the air from being cooled in the duct 31, but also prevents the pressure of the refrigerant drawn into the compressor 11 from dropping due to the pressure loss in the second indoor heat exchanger 16. The bypass passage 19 may connect the second pipe 22 and the seventh pipe 27.

(Second Embodiment)

Figure 8:
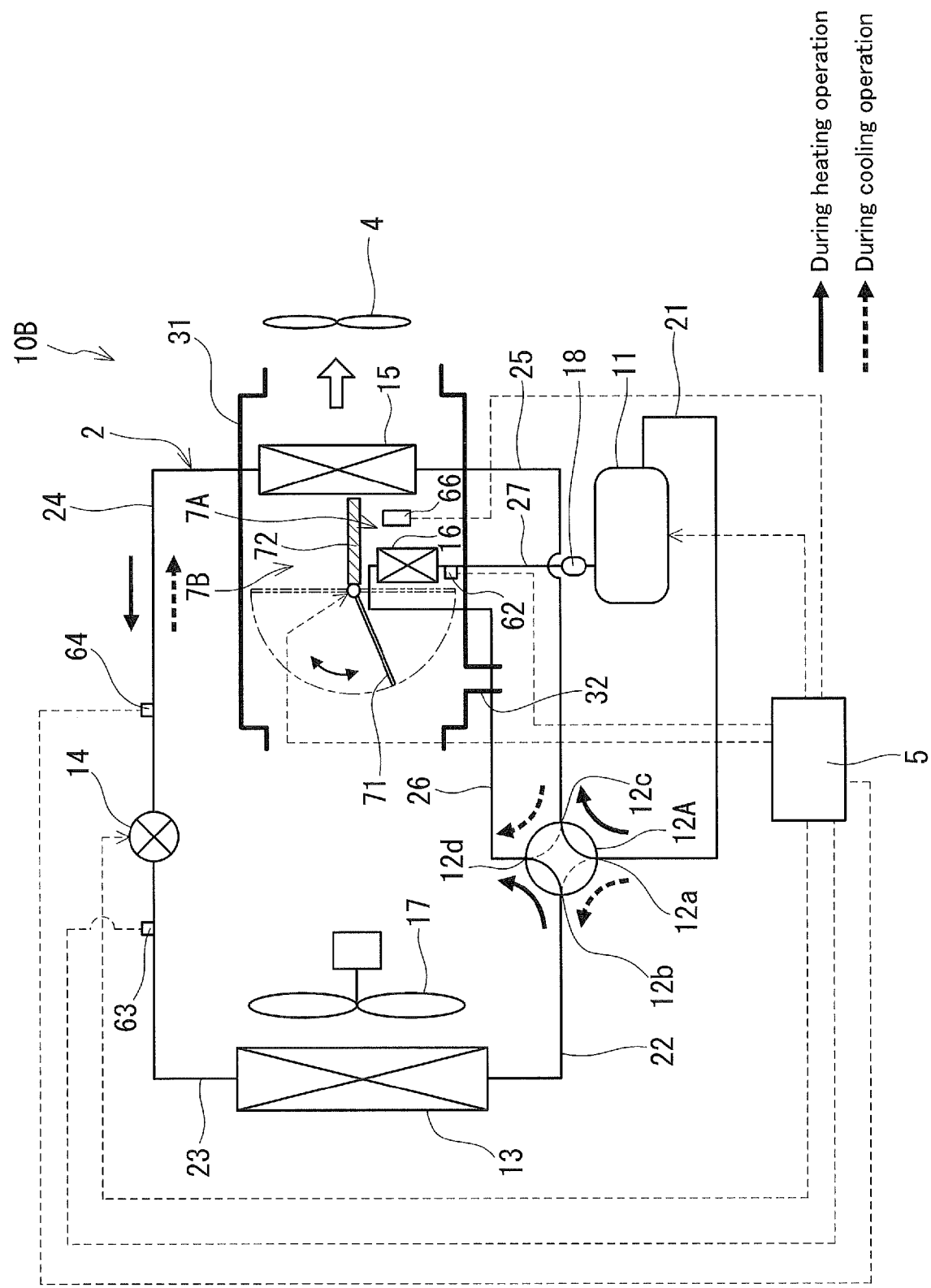
FIG. 8 is a diagram showing a configuration of a vehicle air conditioner according to a second embodiment of the present invention.

FIG. 8 is a diagram showing the configuration of a vehicle air conditioner 10B according to the second embodiment of the present invention. In the present embodiment, the same components as those in the first embodiment are designated by the same reference numerals, and no further description is given.

Also in the present embodiment, as in the first embodiment, during the heating operation, the four-way valve 12A is shifted to the second position so that the flow direction of the refrigerant flowing in the heat pump circuit 2 is switched to the second direction indicated by solid line arrows, and during the cooling operation, the four-way valve 12A is shifted to the first position so that the flow direction of the refrigerant flowing in the heat pump circuit 2 is switched to the first direction indicated by dotted line arrows. Therefore, the operation of each device and the flowing manner of the refrigerant are the same as those in the vehicle air conditioner 10A of the first embodiment shown in FIG. 1. As the refrigerant, R143a, R410A, HFO-1234yf, $CO_2$, or the like can be used, as in the first embodiment.

In the present embodiment, the second indoor heat exchanger 16 located upstream of the first indoor heat exchanger 15 in the air flow direction in the duct 31 is disposed so that a first flow path 7A passing through the second indoor heat exchanger 16 and a second flow path 7B not passing through the second indoor heat exchanger 16 are layered in the duct 31. For example, the second indoor heat exchanger 16 may be disposed on one side of the duct 31 near the wall thereof so that the first indoor heat exchanger 15 is exposed to the upstream side from beside the second indoor heat exchanger 16, in other words, so that some space in which air bypassing the second indoor heat exchanger 16 can flow is formed beside the second indoor heat exchanger 16. Alternatively, a portion of the duct 31 surrounding the second indoor heat exchanger 16 may be expanded so that air bypassing the second indoor heat exchanger 16 can flow through the expanded portion. If the duct 31 has an inner wall consisting of a ceiling, a bottom, and a pair of laterals, the second indoor heat exchanger 16 preferably is placed adjacent to the bottom of the duct 31 away from the ceiling thereof.

Furthermore, a damper 71 is provided upstream of the second indoor heat exchanger 16 in the duct 31. This damper 71 adjusts the ratio between the amount of air flowing through the first flow path 7A leading to the first indoor heat exchanger 15 through the second indoor heat exchanger 16 and the amount of air flowing through the second flow path 7B leading to the first indoor heat exchanger 15 not through the second indoor heat exchanger 16. In the present embodiment, a partition 72 that is flat in the air flow direction in the duct 31 and separates the first flow path 7A and the second flow path 7B is provided in the duct 31. The pivot shaft of the damper 71 is mounted at the end of the partition 72 opposite to the first indoor heat exchanger 15.

The air taken into the duct 31 by the indoor fan 4 is divided by the damper 71 into a stream flowing through the first flow path 7A and a stream flowing through the second flow path 7B. The stream of air flowing through the first flow path 7A comes in contact with the second indoor heat exchanger 16 and is cooled and dehumidified. Then, it comes in contact with the first indoor heat exchanger 15 and is heated or cooled. The stream of air flowing through the second flow path 7B comes in contact only with the first indoor heat exchanger 15 and is heated or cooled. These streams of air are blown from the duct 31 into the cabin.

The damper is swung by a servo motor (not shown). It is preferable to control the velocity of the air passing through the second indoor heat exchanger 16 in order to maximize the dehumidification performance of the second indoor heat exchanger 16. Therefore, the proportion of air to be distributed (hereinafter referred to simply as a "proportion of distribution") to the first flow path 7A by the damper 71 is determined according to the air volume of the indoor fan 4. For example, if the operation of the indoor fan 4 has three levels, high, medium and low, the proportion of distribution also is set to three levels, high, medium and low to control the damper angle according to the operation level of the indoor fan 4. For example, high, medium, and low proportions of distribution are 100%, 50%, and 25%, respectively. In this case, the second flow path 7B is closed when the damper 71 is in the high distribution proportion state, equal amounts of air are allowed to flow through the first flow path 7A and the second flow path 7B when the damper 71 is in the medium distribution proportion state, and the first flow path 7A is semi-closed when the damper 71 is in the low distribution proportion state.

That is, the damper 71 can adjust, with its angle, the ratio of the amount of air to be brought into contact with the second indoor heat exchanger 16 and the amount of air not to be brought into contact with the second indoor heat exchanger 16. Then, these streams of air are merged downstream of the first indoor heat exchanger 15, and the merged air is blown into the cabin.

A table, in which the rotation degrees of the servo motor are associated with the operation levels of the indoor fan 4, is stored in the memory. The damper 71 is shifted to the low distribution proportion state when the operation level of the indoor fan 4 is high, to the medium distribution proportion state when the operation level is medium, and to the high distribution proportion state when the operation level is low. Under this control, the velocity of the air passing through the second indoor heat exchanger 16 can be maintained constant.

A placement of a dehumidification temperature sensor 66 at the outlet of the first flow path 7A to detect the temperature of the air that has passed through the second indoor heat exchanger 16 allows the surface of the second indoor heat exchanger 16 to be controlled to prevent its drying. According to this control, the latent heat of the moisture in the air can be reliably recovered in the second heat exchanger 16 during the heating operation. For that purpose, for example, the temperature difference between the temperature of the surface of the second indoor heat exchanger 16 and the temperature of the air detected by the dehumidification temperature sensor 66 may be maintained at a predetermined value (for example, 1° C. to 5° C.), assuming that the former temperature is equal to the saturation temperature of the refrigerant at a pressure at which it is drawn into the compressor 11. When Tdh is the temperature of the air detected by the dehumidification temperature sensor 66 and Tscsat is the saturation temperature of the refrigerant at a pressure at which it is drawn into the compressor 11 (i.e., the temperature of the refrigerant detected by the first liquid-gas refrigerant temperature sensor 63 or the second liquid-gal refrigerant temperature sensor 64 in the present embodiment), the proportion of distribution is adjusted by ΔD every 10 seconds, for example, to obtain the temperature difference of 3° C. between Tdh and Tscsat, using the following equation:

$$\Delta D = (Tscsat - Tdh + 3)/100 \quad \text{(Equation 2)}$$

For example, if Tscsat is 5° C., Tdh is 10° C., and the current proportion of distribution is 50%, ΔD is −2%, resulting in a change in the proportion of distribution to 48%.

As described above, in the vehicle air conditioner 10B of the present embodiment, the cooling operation and the heating operation can be switched instantaneously only by shifting the four-way valve 12A. Furthermore, the dehumidification capacity can be adjusted during each of the cooling operation and the heating operation by using the damper 71 to control the amount of air to be brought into contact with the second indoor heat exchanger 16 and the amount of air not to be brought into contact with the second indoor heat exchanger 16.

Moreover, in the vehicle air conditioner 10B of the present embodiment, the cooling operation and the heating operation can be performed with a simple configuration to control a four-way valve and a single expansion mechanism.

<Modification>

In the embodiment described above, the damper 71 is provided on the windward side of the partition 72, but the damper 71 may be provided on the leeward side of the partition 72.

In the embodiment described above, the partition 72 is provided in the duct 31, but even without the partition 72, the damper 71 can be used to change the ratio between the amount of air flowing through the first flow path 7A and the amount of air flowing through the second flow path 7B. Furthermore, there is no space between the partition 72 and the first indoor heat exchanger 15 in FIG. 8, but there may be a space for allowing the streams of air to mix therein.

(Third Embodiment)

Figure 9:
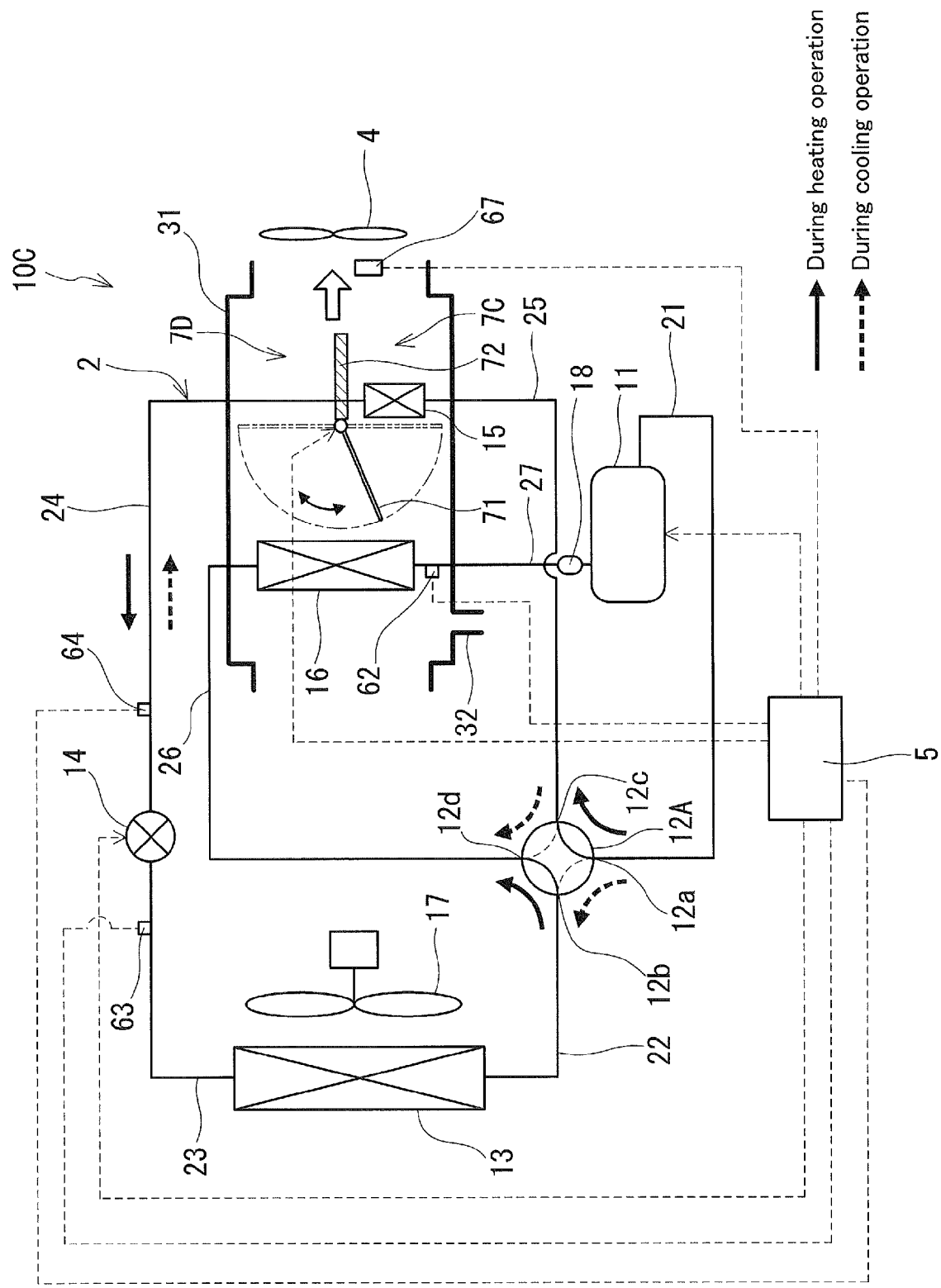
FIG. 9 is a diagram showing a configuration of a vehicle air conditioner according to a third embodiment of the present invention.

FIG. 9 is a diagram showing the configuration of a vehicle air conditioner 10C according to the third embodiment of the present invention. In the present embodiment, the same components as those in the first embodiment are designated by the same reference numerals, and no further description is given.

Also in the present embodiment, as in the first embodiment, during the heating operation, the four-way valve 12A is shifted to the second position so that the flow direction of the refrigerant in the heat pump circuit 2 is switched to the second direction indicated by solid line arrows, and during the cooling operation, the four-way valve 12A is shifted to the first position so that the flow direction of the refrigerant in the heat pump circuit 2 is switched to the first direction indicated by dotted line arrows. Therefore, the operation of each device and the flowing manner of the refrigerant are the same as those in the vehicle air conditioner 10A of the first embodiment shown in FIG. 1. As the refrigerant, R143a, R410A, HFO-1234yf, $CO_2$, or the like can be used, as in the first embodiment.

In the present embodiment, the first indoor heat exchanger 15 located downstream of the second indoor heat exchanger 16 in the air flow direction in the duct 31 is disposed so that a third flow path 7C passing through the first indoor heat exchanger 15 and a fourth flow path 7D not passing through the first indoor heat exchanger 15 are layered in the duct 31. For example, the first indoor heat exchanger 15 may be placed on one side of the duct 31 near the wall thereof so that the second indoor heat exchanger 16 is exposed to the downstream side from beside the first indoor heat exchanger 15, when viewed from the downstream side, in other words, so that some space in which air bypassing the first indoor heat exchanger 15 can flow is formed beside the first indoor heat exchanger 15. Alternatively, a portion of the duct 31 surrounding the first indoor heat exchanger 15 may be expanded so that the air bypassing the first indoor heat exchanger 15 can flow through the expanded portion. If the duct 31 has an inner wall consisting of a ceiling, a bottom and a pair of laterals, the first indoor heat exchanger 15 preferably is placed adjacent to the bottom of the duct 31 away from the ceiling thereof.

Furthermore, a damper 71 is provided upstream of the first indoor heat exchanger 15 in the duct 31. This damper 71 adjusts the ratio between the amount of air flowing through a third flow path 7C leading to the outlet of the duct through the first indoor heat exchanger 15 and the amount of air flowing through a fourth flow path 7D leading to the outlet of the duct not through the first indoor heat exchanger 15. In the present embodiment, a partition 72 that is flat in the air flow direction in the duct 31 and separates the third flow path 7C and the fourth flow path 7D is provided in the duct 31. The pivot shaft of the damper 71 is mounted at the end of the partition 72 near the second indoor heat exchanger 16.

The air taken into the duct 31 by the indoor fan 4 is divided by the damper 71 into a stream flowing through the third flow path 7C and a stream flowing through the fourth flow path 7D.

The stream of air flowing through the third flow path 7C comes in contact with the second indoor heat exchanger 16 and is cooled and dehumidified. Then, it comes in contact with the first indoor heat exchanger 15 and is heated or cooled. The stream of air flowing through the fourth flow path 7D comes in contact only with the second indoor heat exchanger 16 and is cooled and dehumidified. These streams of air are merged downstream of the first indoor heat exchanger 15, and then the merged air is blown from the duct 31 into the cabin.

The damper 71 is swung by a servo motor (not shown). The damper 71 can adjust, with its angle, the ratio of the amount of air to be brought into contact with the first indoor heat exchanger 15 and the amount of air not to be brought into contact with the first indoor heat exchanger 15. Then, these streams of air are merged downstream of the first indoor heat exchanger 15, and the merged air is blown into the cabin.

An exiting air temperature sensor 67 in FIG. 9 is a sensor for detecting the temperature of the air blown into the cabin from the duct 31. The proportion of distribution to the third flow path 7C by the damper 71 is controlled using the servo motor so that the temperature detected by the exiting air temperature sensor 67 becomes equal to Tw (i.e., the temperature of the exiting air required to maintain the cabin temperature at a preset temperature).

As described above, in the vehicle air conditioner 10C of the present embodiment, the cooling operation and the heating operation can be switched instantaneously only by shifting the four-way valve 12A. Furthermore, the temperature of the air at the outlet of the duct 31 can be adjusted by using the damper 71 to control the amount of air to be brought into contact with the first indoor heat exchanger 15 and the amount of air not to be brought into contact with the first indoor heat exchanger 15.

Moreover, in the vehicle air conditioner 10C of the present embodiment, the cooling operation and the heating operation can be performed with a simple configuration to control a four-way valve and a single expansion mechanism.

(Fourth Embodiment)

Figure 10:
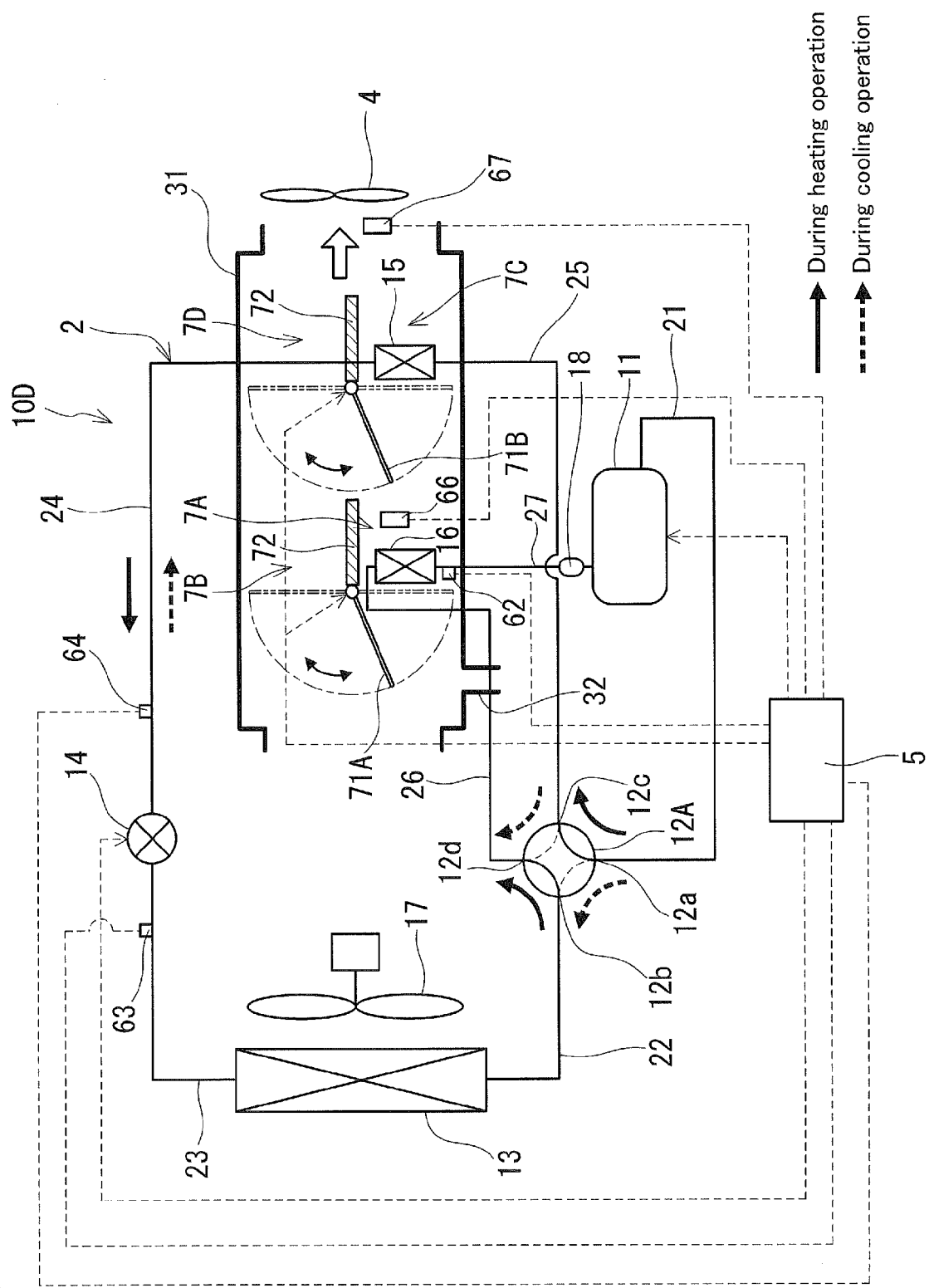
FIG. 10 is a diagram showing a configuration of a vehicle air conditioner according to a fourth embodiment of the present invention.

FIG. 10 is a diagram showing the configuration of a vehicle air conditioner 10D according to the fourth embodiment of the present invention. This vehicle air conditioner 10D has a configuration that combines the vehicle air conditioner 10B of the second embodiment and the vehicle air conditioner 10C of the third embodiment.

Specifically, in the vehicle air conditioner 10D, the second indoor heat exchanger 16 is disposed so that a first flow path 7A passing through the second indoor heat exchanger 16 and a second flow path 7B not passing through the second indoor heat exchanger 16 are layered in the duct 31, and the first indoor heat exchanger 15 is disposed so that a third flow path 7C passing through the first indoor heat exchanger 15 and a fourth flow path 7D not passing through the first indoor heat exchanger 15 are layered in the duct 31. The specific configurations of these components are the same as those described in the second embodiment and the third embodiment.

The duct 31 further has a first damper 71A therein for adjusting the ratio between the amount of air flowing through the first flow path 7A and the amount of air flowing through the second flow path 7B, and has a second damper 71B therein for adjusting the ratio between the amount of air flowing through the third flow path 7C and the amount of air flowing through the fourth flow path 7D. The pivot shaft of the first damper 71A is mounted at the windward end of a partition 72 for separating the first flow path 7A and the second flow path 7B, and the pivot shaft of the second damper 71B is mounted at the windward end of a partition 72 for separating the third flow path 7C and the fourth flow path 7D.

The air taken into the duct 31 by the indoor fan 4 is divided by the first damper 71A into a stream flowing through the first flow path 7A and a stream flowing through the second flow path 7B. The stream of air flowing through the first flow path 7A comes in contact with the second indoor heat exchanger 16 and is cooled and dehumidified. Then, it is merged with the stream of air flowing through the second flow path 7B. The merged air is divided by the second damper 71B into a stream flowing through the third flow path 7C and a stream flowing through the fourth flow path 7D. The stream of air flowing through the third flow path 7C comes in contact with the first indoor heat exchanger 15 and is heated or cooled. Then, it is merged with the stream of air flowing through the fourth flow path 7D. The merged air is blown from the duct 31 into the cabin.

The first damper 71A and the second damper 71B are swung by a servo motor (not shown). The first damper 71A can adjust, with its angle, the ratio of the amount of air to be brought into contact with the second indoor heat exchanger 16 and the amount of air not to be brought into contact with the second indoor heat exchanger 16. The second damper 71B can adjust, with its angle, the ratio of the amount of air to be brought into contact with the first indoor heat exchanger 15 and the amount of air not to be brought into contact with the first indoor heat exchanger 15. With such a configuration, the heating operation or the cooling operation can be performed under appropriate conditions for the required capacity. An example of such control is described below.

<Heating Operation>

During the heating operation, the four-way valve 12A is shifted to the second position, so that the flow direction of the refrigerant in the heat pump circuit 2 is switched to the second direction indicated by solid line arrows.

For example, when the temperature difference between the temperature in the cabin and the temperature outside the cabin is large, it is preferable to maximize the heating capacity. In this case, the proportion of distribution to the first flow path 7A by the first damper 71A is minimized (0%), and the proportion of distribution to the third flow path 7C by the second damper 71B is maximized (100%). That is, the air taken into the duct 31 by the indoor fan 4 is brought into contact only with the first indoor heat exchanger 15.

When the humidity in the cabin is high, heating may be performed while dehumidifying the cabin. In this case, the proportion of distribution to the third flow path 7C by the second damper 71B is maximized (100%), while the proportion of distribution to the first flow path 7A by the first damper 71A is set to an intermediate value at which an appropriate amount of air is supplied to the second heat exchanger 16. Thereby, the same effects as those of the second embodiment can be obtained.

Furthermore, from the viewpoint of supplying air at an appropriate velocity to both of the second indoor heat exchanger 16 and the first heat exchanger 15, both of the proportion of distribution to the first flow path 7A by the first damper 71A and the proportion of distribution to the third flow path 7C by the second damper 71B may be set to an intermediate value.

<Cooling Operation>

During the cooling operation, the four-way valve 12A is shifted to the first position so that the flow direction of the refrigerant in the heat pump circuit 2 is switched to the first direction indicated by dotted line arrows.

For example, when the temperature difference between the temperature in the cabin and the temperature outside the cabin is large, it is preferable to maximize the cooling capacity. In this case, both of the proportion of distribution to the first flow path 7A by the first damper 71A and the proportion of distribution to the third flow path 7C by the second damper 71B are maximized (100%). That is, the air taken into the duct 31 by the indoor fan 4 is brought into contact with both of the second indoor heat exchanger 16 and the first indoor heat exchanger 15.

Conversely, when the temperature difference between the temperature in the cabin and the temperature outside the cabin is small, the dehumidification capacity may be enhanced. In this case, the proportion of distribution to the first flow path 7A by the first damper 71A is set to an intermediate value at which an appropriate amount of air is supplied to the second heat exchanger 16, and the proportion of distribution to the third flow path 7C by the second damper 71B is set to an intermediate value at which an appropriate amount of air is supplied to the first heat exchanger 15.

Furthermore, when the required cooling capacity is low, either one of the proportion of distribution to the first flow path 7A by the first damper 71A and the proportion of distribution to the third flow path 7C by the second damper 71B may be minimized (0%).

The angles of the first damper 71A and the second damper 71B may be fixed for the operation mode as described above so that the air conditioning capacity is adjusted by the rotational speed of the compressor 11. Alternatively, in addition to the rotational speed of the compressor 11, the angles of the first damper 71A and the second damper 71B also may be changed.

When the proportion of distribution to the first flow path 7A by the first damper 71A is set to an intermediate value, the angle of the first damper 71A may be adjusted according to the operation level of the indoor fan 4 so that the air passes through the second indoor heat exchanger 16 at a constant velocity, in the same manner as described in the second embodiment. Alternatively, in order to reliably recover the latent heat of the moisture in the air in the second indoor heat exchanger 16 during the heating operation, the angle of the first damper 71A may be adjusted based on the temperature of the air detected by the dehumidification temperature sensor 66 and on the saturation temperature of the refrigerant at a pressure at which it is drawn into the compressor 11 so that the surface of the second indoor heat exchanger 16 does not dry out, in the same manner as described in the second embodiment.

On the other hand, when the proportion of distribution to the third flow path 7C by the second damper 71B is set to an intermediate value, the angle of the second damper 71B may be adjusted based on the temperature of the air detected by the exiting air temperature sensor 67, in the same manner as described in the second embodiment.

In the vehicle air conditioner 10D of the present embodiment, the cooling operation and the heating operation can be performed with a simple configuration to control a four-way valve and a single expansion mechanism.

<Modification>

In FIG. 10, the second indoor heat exchanger 16 and the first indoor heat exchanger 15 are arranged on the same side of the partitions 72, and the first flow path 7A passing through the second indoor heat exchanger 16 and the third flow path 7C passing through the first indoor heat exchanger 15 form a continuous flow path. However, the arrangement of the second indoor heat exchanger 16 and the first indoor heat exchanger 15 is not limited to this.

Figure 11:
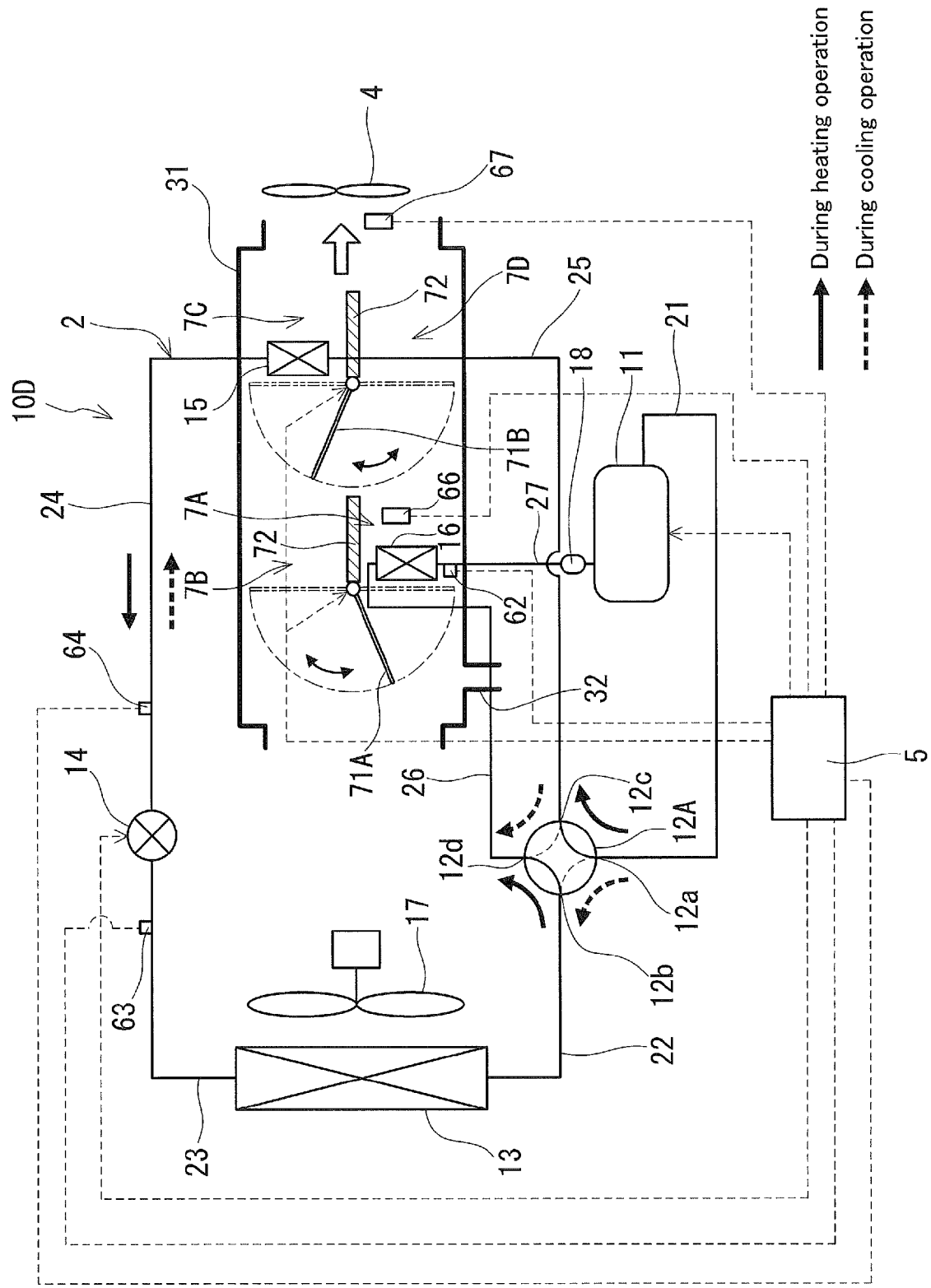
FIG. 11 is a diagram showing a configuration of a vehicle air conditioner according to a modification of the fourth embodiment.

For example, as shown in FIG. 11, the second indoor heat exchanger 16 and the first indoor heat exchanger 15 may be arranged on the opposite sides of the partitions 72 so that the first flow path 7A passing through the second indoor heat exchanger 16 and the fourth flow path 7D not passing through the first indoor heat exchanger 15 form a continuous flow path and that the first flow path 7B not passing through the second indoor heat exchanger 16 and the third flow path 7C passing through the first indoor heat exchanger 15 form a continuous flow path. With such a configuration, the air taken into the duct 31 by the indoor fan 4 is brought into contact with both of the second indoor heat exchanger 16 and the first indoor heat exchanger 15 in parallel. Therefore, the pressure drop of the air passing through the duct 31 and the cooling efficiency can be improved.

Even in the configuration shown in FIG. 11, the heating operation or the cooling operation can be performed under appropriate conditions for the required capacity by performing the same control as in the embodiment described above.

(Other Embodiments)

Figure 12A:
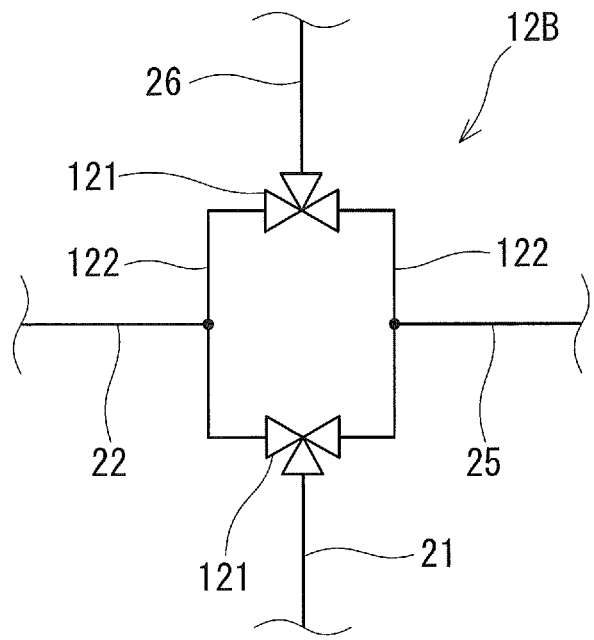
FIGS. 12A and 12B are diagrams of alternative switching members.
Figure 12B:
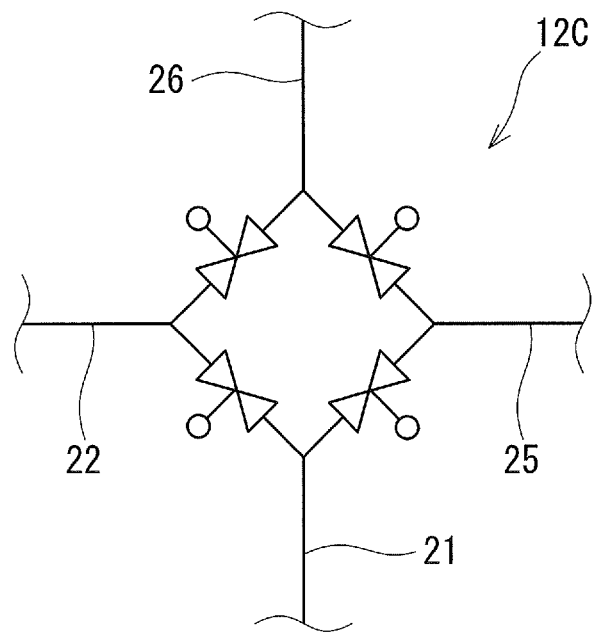

In each of the above-described embodiments, the four-way valve 12A is used as a switching member, but the switching member of the present invention is not limited to this. For example, as shown in FIG. 12A, the switching member may be a circuit 12B in which two three-way valves 121, one connected to the first pipe 21 and the other connected to the sixth pipe 26, are connected to form a loop by a pair of pipes 122, one connected to the second pipe 22 and the other connected to the fifth pipe 25. Alternatively, the switching member may be a so-called bridge circuit 12C as shown in FIG. 12B.

In each of the above-described embodiments, the indoor fan 4 is placed on the leeward side of the duct 31. In such a configuration, the fan generates no swirl in the air flow on the suction side of the fan. Therefore, less turbulent air can be supplied to the second indoor heat exchanger 16 and the first indoor heat exchanger 15. As a result, the pressure loss is reduced, which reduces the rotational speed of the fan and the power consumption.

However, the indoor fan 4 may be placed on the windward side of the duct 31. In such a configuration, since the indoor fan 4 can be located away from the outlet of the duct 31, the noise of the fan can be reduced. Furthermore, in the configuration in which the indoor fan 4 is placed on the windward side of the duct 31, even if condensation occurs on the surface of the indoor fan 4 by a change in the conditions of the air passing through the indoor fan 4, condensation water droplets are prevented from being blown off from the outlet of the duct 31.

INDUSTRIAL APPLICABILITY

Since the vehicle air conditioner of the present invention has enhanced dehumidification capacity during the cooling operation to improve comfort and defogs the window glass during the heating operation to ensure clear visibility, it is useful particularly for non-combustion type vehicles such as electric vehicles and fuel cell vehicles.

The invention claimed is:

1. A vehicle air conditioner for cooling and heating a cabin, comprising:
   a heat pump circuit including: a compressor for compressing a refrigerant; an outdoor heat exchanger for performing heat exchange between the refrigerant and air outside the cabin; an expansion mechanism for expanding the refrigerant; and a first indoor heat exchanger and a second indoor heat exchanger each for performing heat exchange between the refrigerant and air blown into the cabin by a fan; and a switching member, provided in the heat pump circuit, for switching a flow direction of the refrigerant in the heat pump circuit between a first direction and a second direction, the first direction being a direction in which the refrigerant flows (a) from the compressor to the outdoor heat exchanger, (b) from the outdoor heat exchanger to the expansion mechanism, (c) from the expansion mechanism to the first indoor heat exchanger, (d) from the first indoor heat exchanger to the second indoor heat exchanger, and (e) from the second indoor heat exchanger before returning to the compressor, and the second direction being a direction in which the refrigerant flows (a) from the compressor to the first indoor heat exchanger, (b) from the first indoor heat exchanger to the expansion mechanism, (c) from the expansion mechanism to the outdoor heat exchanger, (d) from the outdoor heat exchanger to the second indoor heat exchanger, and (e) from the second indoor heat exchanger before returning to the compressor.

2. The vehicle air conditioner according to claim 1, further comprising a duct in which the first indoor heat exchanger and the second indoor heat exchanger are disposed, and through which air inside the cabin and/or air outside the cabin is allowed to flow by the fan.

3. The vehicle air conditioner according to claim 2, wherein the first indoor heat exchanger and the second indoor heat exchanger are arranged in a flow direction of the air in the duct, and the second indoor heat exchanger is located upstream of the first indoor heat exchanger.

4. The vehicle air conditioner according to claim 3, wherein the second indoor heat exchanger is disposed so that a first flow path passing through the second indoor heat exchanger and a second flow path not passing through the second indoor heat exchanger are layered in the duct.

5. The vehicle air conditioner according to claim 4, wherein the duct has a damper therein for adjusting a ratio between an amount of air flowing through the first flow path and an amount of air flowing through the second flow path.

6. The vehicle air conditioner according to claim 5, wherein the duct has a partition therein for separating the first flow path and the second flow path.

7. The vehicle air conditioner according to claim 3, wherein the first indoor heat exchanger is disposed so that a third flow path passing through the first indoor heat exchanger and a fourth flow path not passing through the first indoor heat exchanger are layered in the duct.

8. The vehicle air conditioner according to claim 3, wherein
the second indoor heat exchanger is disposed so that a first flow path passing through the second indoor heat exchanger and a second flow path not passing through the second indoor heat exchanger are layered in the duct,
the first indoor heat exchanger is disposed so that a third flow path passing through the first indoor heat exchanger and a fourth flow path not passing through the first indoor heat exchanger are layered in the duct, and
the duct has a first damper therein for adjusting a ratio between an amount of air flowing through the first flow path and an amount of air flowing through the second flow path, and has a second damper therein for adjusting a ratio between an amount of air flowing through the third flow path and an amount of air flowing through the fourth flow path.

9. The vehicle air conditioner according to claim 1, further comprising a controller for controlling the switching member to switch the flow direction of the refrigerant in the heat pump circuit to the first direction during a cooling operation, and to the second direction during a heating operation.

10. The vehicle air conditioner according to claim 9, further comprising a refrigerant temperature sensor for detecting a temperature of the refrigerant leaving the second indoor heat exchanger, wherein
the controller controls the expansion mechanism based on the temperature of the refrigerant detected by the refrigerant temperature sensor.

11. The vehicle air conditioner according to claim 10, wherein the controller controls the expansion mechanism so that a temperature difference between a saturation temperature of the refrigerant at a pressure at which the refrigerant is drawn into the compressor and the temperature of the refrigerant detected by the refrigerant temperature sensor becomes equal to a predetermined degree of superheat.

12. The vehicle air conditioner according to claim 1, wherein the switching member comprises a four-way valve positioned to be between the compressor and the outdoor heat exchanger relative to the flow of refrigerant in the first direction, and between the outdoor heat exchanger and the second indoor heat exchanger relative to the flow of refrigerant in the second direction, the four-way valve being shiftable between first and second positions that respectively permit the refrigerant to flow in the first and second directions.

* * * * *